(12) United States Patent
Kaufhold

(10) Patent No.: US 10,097,905 B2
(45) Date of Patent: Oct. 9, 2018

(54) SWITCHING MATRIX

(71) Applicant: United Technologists Europe Ltd., Hadleigh, Suffolk (GB)

(72) Inventor: Gerwin Frank Kaufhold, Hadleigh (GB)

(73) Assignee: UNITED TECHNOLOGISTS EUROPE LIMITED (GB)

( * ) Notice: Subject to any disclaimer, the term of this patent is extended or adjusted under 35 U.S.C. 154(b) by 2 days.

(21) Appl. No.: 15/516,520

(22) PCT Filed: Oct. 15, 2015

(86) PCT No.: PCT/GB2015/053071
§ 371 (c)(1),
(2) Date: Apr. 3, 2017

(87) PCT Pub. No.: WO2016/059422
PCT Pub. Date: Apr. 21, 2016

(65) Prior Publication Data
US 2017/0303012 A1    Oct. 19, 2017

(30) Foreign Application Priority Data
Oct. 16, 2014    (GB) .................................. 1418380.0

(51) Int. Cl.
*H04Q 1/14*    (2006.01)
*H04M 3/00*    (2006.01)
*H04Q 3/00*    (2006.01)

(52) U.S. Cl.
CPC ....... *H04Q 1/145* (2013.01); *H04Q 2213/076* (2013.01)

(58) Field of Classification Search
CPC ........ H04L 49/106; H04Q 1/14; H04Q 1/145; H04Q 3/0012; H04Q 2213/076
(Continued)

(56) References Cited

U.S. PATENT DOCUMENTS 4,421,965 A * 12/1983 Gentric ................. H01H 67/26
                                                              200/175
4,463,235 A *  7/1984 Genric  ................. H02B 1/207
                                                              200/175

(Continued)

FOREIGN PATENT DOCUMENTS

EP    2141933 A1    1/2010

*Primary Examiner* — Harry S Hong
(74) *Attorney, Agent, or Firm* — McGarry Bair PC

(57) ABSTRACT

An XYX cross-connect switching matrix (200) is provided for use in telecommunications apparatus. The matrix (200) comprises first (10), second (20) and third (30) arrays of parallel conductor tracks (11-14, 21-28, 15-18). The parallel conductor tracks (21-28) of the second array (20) are oriented perpendicular to the conductor tracks (11-14) of the first array (10) and to the conductor tracks (15-18) of the third array (30). The first (10), second (20) and third arrays (30) each lie in planes parallel to and spaced from one another, with the second array (20) being located between the first (10) and third (30) arrays. A first set of electrical contact sleds (41) is provided between the first (10) and second (20) arrays, while a second set of electrical contact sleds (42) is provided between the second (20) and third (30) arrays. These sleds (41,42) enable any X conductor track (11-18) in the first (10) or third (30) array to be electrically connected to any Y conductor track (21-28) in the second array (20).

10 Claims, 4 Drawing Sheets

(58) Field of Classification Search
USPC .......................................................... 379/325
See application file for complete search history.

(56) References Cited

U.S. PATENT DOCUMENTS

| | | | | |
|---|---|---|---|---|
| 4,817,134 A * | 3/1989 | Pickens | .................. | H04Q 1/145 |
| | | | | 200/176 |
| 5,456,608 A * | 10/1995 | Rogers | .................... | H01R 29/00 |
| | | | | 29/845 |
| 7,193,487 B2 * | 3/2007 | Alexander | ................ | H01P 1/10 |
| | | | | 333/104 |
| 7,991,145 B2 * | 8/2011 | Roos | ...................... | H04Q 1/145 |
| | | | | 379/306 |
| 8,385,535 B2 * | 2/2013 | Roos | ...................... | H04Q 1/145 |
| | | | | 379/325 |
| 2006/0139119 A1 | 6/2006 | Alexander | | |
| 2010/0008494 A1 | 1/2010 | Roos | | |

* cited by examiner

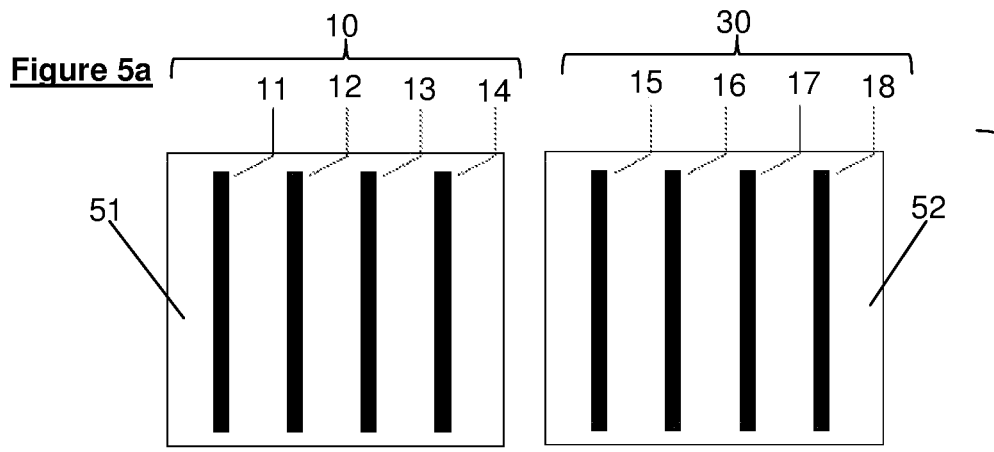
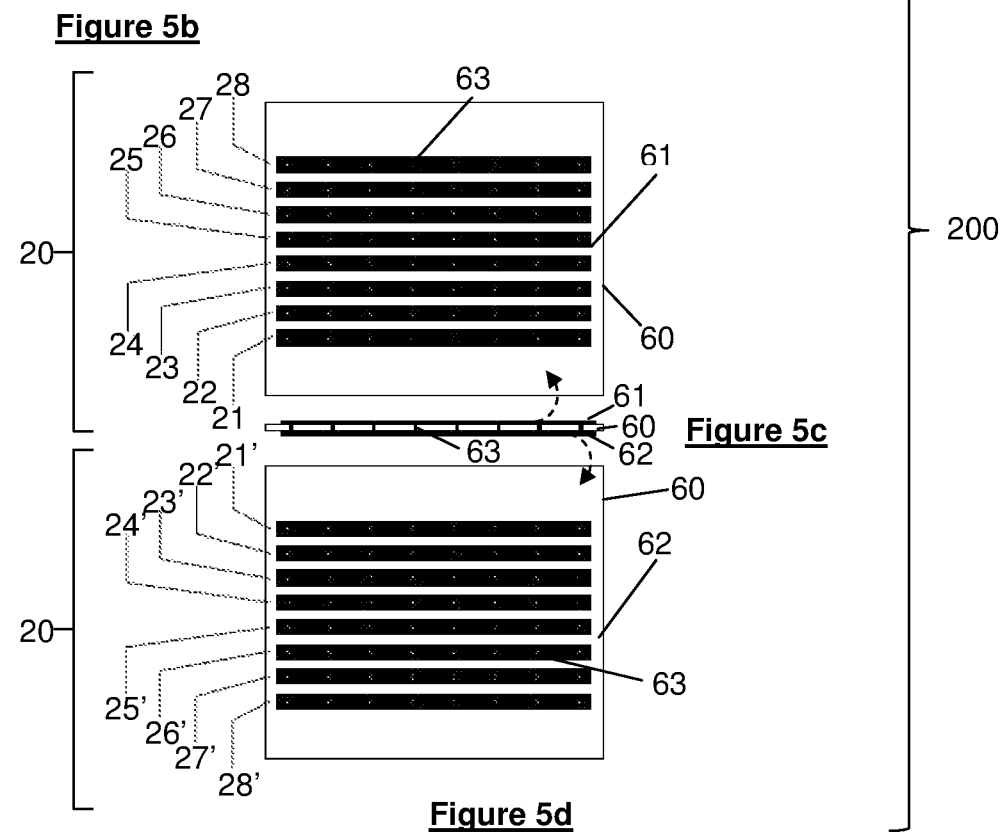

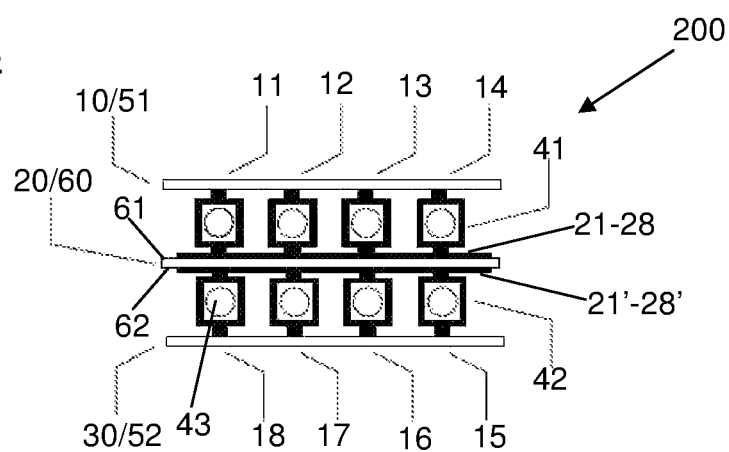

SWITCHING MATRIX

This application is a National Phase application of International Application No. PCT/GB2015/053071, filed Oct. 15, 2015, which claims the benefit of British Application GB 1418380.0, filed on Oct. 16, 2014, both which are incorporated herein in their entireties.

The present invention relates to a telecommunications switching matrix for use in street cabinets. In particular, it relates to a switching matrix for cross-connecting customer circuits within a distribution frame.

In order to provide telecommunication services, individual customer circuits need to be electrically connected to specific ports on telecommunications equipment. Conventionally, this has been achieved by manually cross-connecting IDC (insulation displacement connector) strips or wiring blocks connected to telecommunication equipment ports, with similar strips of blocks connected to customer lines. The connections are carried out using twisted pair copper wire, within telecommunications apparatus known as a distribution frame.

As this process is labour intensive and vulnerable to human error, significant effort has been invested in finding ways of automating this circuit connection process. Accordingly, various permutations of XY cross-connect switching mechanism—also referred to as a switching matrix—have been developed for distribution frame applications. Such XY cross-connect switching matrices utilise driven electrical contact sleds sandwiched between two sets of parallel conductors, also referred to as tracks, offset at 90° to one another, and spaced apart in parallel planes. As is conventional, a first set of conductor tracks arranged in a horizontal orientation are designated 'X', whilst a second set of conductor tracks arranged in vertical orientation are designated 'Y'. The contact sleds are used to provide an electrical connection between specific selected 'X' tracks and specific selected 'Y' tracks.

Such switching matrices can be implemented using two printed circuit boards, constituting the X and Y arrays. The contact sleds run parallel to the orientation of the tracks in one array and perpendicular to the orientation of the tracks in the other array. Any track in the first array can thus be electrically connected to any track in the second array by driving a contact sled to the required XY co-ordinates. In practical applications the contact sleds generally carry two electrical contacts enabling the simultaneous connection of a metallic pair—i.e. a pair of adjacent parallel conductor tracks presented on each of the two arrays.

With the advent of very high speed Digital Subscriber Line (DSL) technology, the electrical transmission characteristic of the XY switching matrix has become critical. Every time a connection is made, a pair of X array tracks is connected somewhere along their length with a pair of Y array tracks. The remaining lengths of track beyond the connection point in both the X and the Y arrays constitute transmission stubs that will detrimentally affect DSL performance and limit Broadband speed. The potential length of the stubs depends on the size of the XY switching matrix. The larger the switching matrix the longer the potential transmission stub lengths will be, and so the greater the detrimental effect.

U.S. Pat. No. 4,817,134 discloses a cross-connect switching mechanism comprising a matrix of cross-points formed by a first set of parallel conductors oriented perpendicular to a second set of parallel conductors.

The present invention seeks to build upon the above disclosure to provide a compact switching matrix with shorter track lengths so as to minimise transmission stub lengths. It is envisaged that this in turn will minimise the potential detrimental effect on DSL transmission performance and Broadband speed. It is further envisaged that minimising transmission stub lengths will also enable the construction of larger cross-connect switching matrices, without detrimentally affecting DSL transmission performance.

According to the present invention there is provided a cross-connect switching matrix for use in telecommunications apparatus, comprising:

a first array of parallel conductor tracks;

a second array of parallel conductor tracks, oriented perpendicular to the conductor tracks of the first array, said second array lying in a plane parallel to and spaced from the plane of the first array;

a third array of parallel conductor tracks, oriented parallel to the conductor tracks of the first array and perpendicular to the conductor tracks of the second array, said third array lying in a plane parallel to and spaced from the plane of the second array;

a first set of electrical contact sleds adapted to be driven between the first and second arrays, thereby to connect any conductor track in the first array with any conductor track in the second array; and a second set of electrical contact sleds adapted to be driven between the second and third arrays, thereby to connect any conductor track in the second array with any conductor track in the third array;

and wherein the second array is located between the first and third arrays.

As noted above, in conventional XY switching matrices, a first array of parallel conductor tracks arranged in a horizontal orientation would be designated 'X', whilst a second set array of conductor tracks arranged in vertical orientation would be designated 'Y'. In the present invention, half of the 'X' parallel conductor tracks which would conventionally be located in the first array have been re-located into a third array, spaced from the second array, said second array being located between the first and third arrays. The switching matrix of the present invention is thus designated as an 'XYX' switching matrix, with 'X' tracks in both the first and third arrays, and 'Y' tracks in the second array.

The telecommunications apparatus in which the switching matrix of the present invention is used is preferably a distribution frame.

In preferred embodiments of the present invention, the parallel conductor tracks of each array are provided as pairs of parallel tracks, and each electrical contact sled carries a pair of electrical contacts adapted to form metallic pair connections with said pairs of parallel tracks. In further variants of the present invention, the contact sleds are adapted to connect multiple conductor tracks on the first and/or third arrays with multiple conductor tracks on the second array.

The electrical contact sleds are adapted to be driven in a direction parallel to the conductor tracks in an adjacent array. Most preferably, the first set of sleds are adapted to be driven in a direction parallel to the conductor tracks in the first array, and the second set of sleds are adapted to be driven in a direction parallel to the conductor tracks in the third array.

To this end, the switching matrix preferably further comprises drive means adapted to drive the contact sleds. Most preferably, the drive means comprises a threaded spindle.

In preferred embodiments of the present invention, the conductor tracks of the second array may be simultaneously presented on both upper and lower faces of the array. In further variants of the present invention, the arrays may take the form of printed circuit boards (PCBs).

In order that the present invention may be fully understood, preferred embodiments thereof will now be described in detail, though only by way of example, with reference to the accompanying drawings, in which:

FIG. 5a shows a face view of first and third 'X' arrays for use in an XYX switching matrix according to a preferred embodiment of the present invention;

FIG. 5b shows a face view of an upper face of a second 'Y' array for use in an XYX switching matrix according to a preferred embodiment of the present invention;

FIG. 5c shows a cross-sectional side view of the second 'Y' array of FIG. 5b;

FIG. 5d shows a face view of a lower face of the second 'Y' array of FIGS. 5b and 5c; and FIG. 6 shows an end view of an XYX switching matrix according to a preferred embodiment of the present invention.

Figure 1:
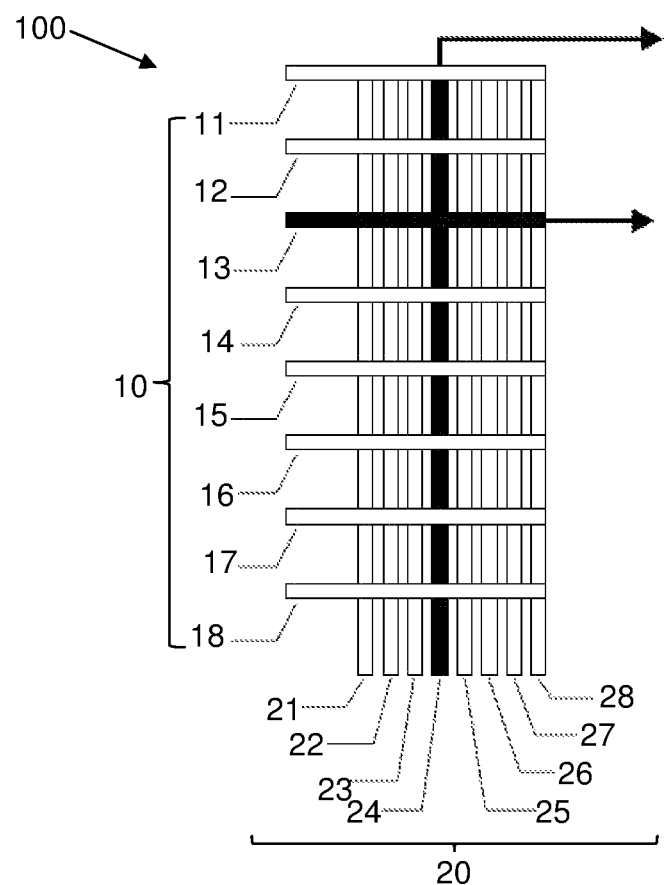
FIG. 1 shows a schematic face view of a conventional XY switching matrix.
Figure 2:
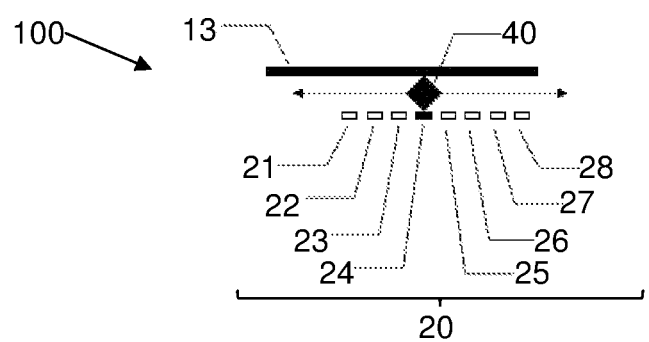
FIG. 2 shows a schematic end view detail of a connection in the conventional XY switching matrix of FIG. 1.

Referring first to FIGS. 1 and 2, there is shown the topology of a conventional single contact 8×8 XY switching matrix, generally indicated 100. A first array 10 of parallel conductor tracks 11-18 are presented in a horizontal 'X' orientation, running from left to right. A second array 20 of parallel conductor tracks 21-28 are presented in a vertical 'Y' orientation, running from top to bottom. The second array 20 lies in a plane parallel to and spaced from the plane of the first array 10.

Individual driven electrical contact sleds 40 are provided for each of the X conductor tracks 11-18. The sleds 40 are adapted to be driven between the first and second arrays 10, 20, in a direction parallel to the X conductor tracks 11-18, thereby enabling connection of their associated X conductor track 11-18 with any one of the Y conductor tracks 21-28 depending on the position of the sled 40. In the configuration shown in FIGS. 1 and 2, the electrical contact sled 40 is positioned so as to effect a connection between a selected X conductor track 13 and a selected Y conductor track 24.

The contact sleds 40 are moved along the X conductor tracks 11-18 by a drive means such as a threaded spindle (not shown). The spacing apart of the X conductor tracks 11-18 is dictated by the width of the contact sleds 40, and this in turn is constrained by the width of the drive spindles that pass through the sleds 40. In practice, the minimum spacing of the conductor tracks 11-18 running in parallel with the drive spindles of the contact sleds 40 is typically three times greater than the minimum spacing of the Y conductor tracks 21-28 running perpendicular to the drive spindles. As a consequence, the length of the Y conductor tracks 21-28 is typically three times longer than that of the X conductor tracks 11-18. These long lengths of conductor track 21-28 result in long transmission stubs and constitute the limiting factor for building larger XY cross-connect matrices 100 for DSL switching.

Figure 3:
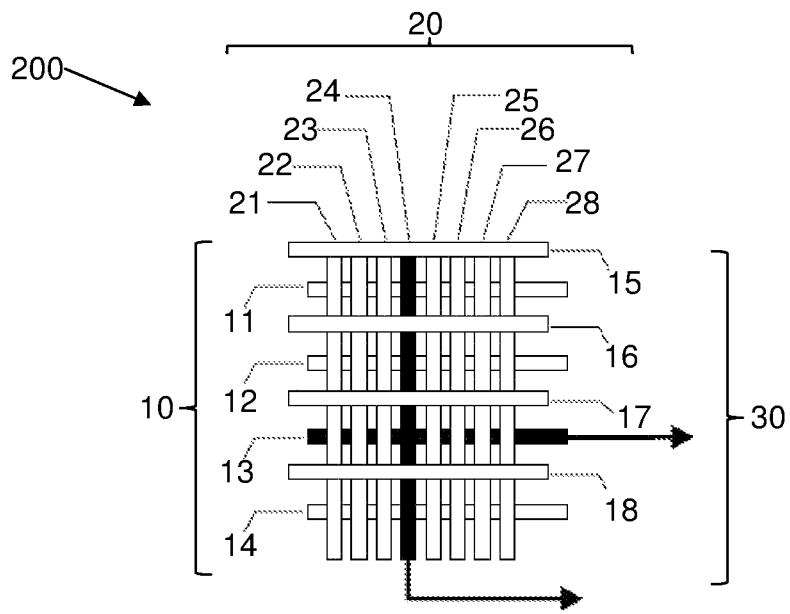
FIG. 3 shows a schematic face view of an XYX switching matrix according to the present invention.
Figure 4:
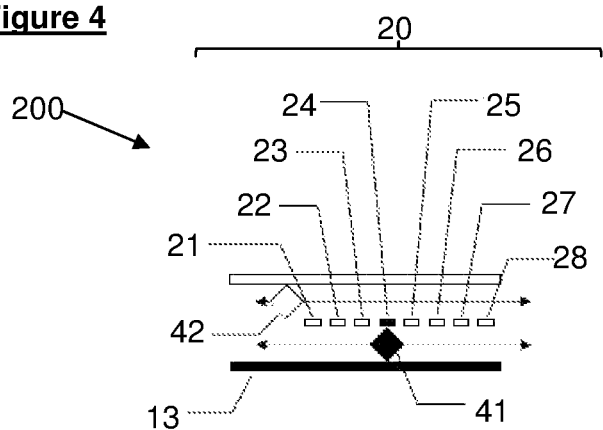
FIG. 4 shows a schematic end view detail of a connection in the XYX switching matrix of FIG. 3.

Referring now to FIGS. 3 and 4, there is shown the topology of an XYX switching matrix, generally indicated 200, according to the present invention. The XYX switching matrix 200 provides the identical cross-connect functionality as the XY switching matrix 100 described above with reference to FIGS. 1 and 2, but with substantially half the maximum cross-connect stub length. As can be seen from FIG. 3, half of the X conductor tracks 11-14 are retained in the first array 10, whilst the other half of the X conductor tracks 15-18 are now re-located in a third array 30. The third array 30 lies in a plane parallel to and spaced from the plane of the second array 20, with said second array 20 being located between said first array 10 and said third array 30.

The electrical contact sleds 40 described above with reference to FIGS. 1 and 2 and now divided equally into two sets: a first set of electrical contact sleds 41 are retained in association with the first array 10, and thus are adapted to be driven between the first and second arrays 10, 20, in a direction parallel to the X conductor tracks 11-14 in the first array; whilst a second sets of electrical contact sleds 42 are re-located so as to be in association with the third array 30, and thus are adapted to be driven between the second and third arrays 20, 30, in a direction parallel to the X conductor tracks 15-18 in the third array 30.

As can be seen in FIG. 3, the first and third 'X' arrays 10, 30 in the XYX switching matrix 200 are substantially half the size of the first 'X' array 10 in the XY switching matrix 100 described above with reference to FIG. 1. The lengths of the individual Y conductor tracks 21-28, and hence the second 'Y' array 20 itself can now also be substantially halved, as two sets of contact sleds 41, 42 arranged either side of the second array 20 can now access either side of the Y track conductors 21-28.

The XYX switching matrix 200 is shown in FIGS. 3 and 4 in a configuration equivalent to that shown in FIGS. 1 and 2, with the electrical contact sled 41 positioned so as to effect a connection between a selected X conductor track 13 and a selected Y conductor track 24. Referring now to FIG. 5 (that is, FIGS. 5a, 5b, 5c and 5d collectively), there is show an exploded view of a preferred embodiment of XYX switching matrix 200 according to the present invention. As shown in FIG. 5a, in this embodiment 200, the X conductor tracks 11-14 of the first array 10 are realised as parallel tracks on a first single sided printed circuit board (PCB) 51. The X conductor tracks 15-18 of the third array 30 are realised as parallel tracks on a second single sided printed circuit board 52.

Referring now to FIGS. 5b and 5d, each of the Y conductor tracks 21-28 of the second array 20 is realised as a pair 21,21'; 22,22' etc. of identical parallel tracks, one member of each pair being arranged on either face 61, 62 of a double sided printed circuit board 60. Each of these pairs of tracks 21,21'-28,28' is interconnected along their length using plated through holes 63 to create a single electrical conductor 21-28 with exposed metallic faces 21,21'-28,28' either side of the PCB 60. A cross-sectional view of the double sided PCB 60 showing the upper and lower faces 61, 62 and the plated through holes 63 interconnecting them is shown in FIG. 5c.

Referring now to FIG. 6, there is shown an assembled XYX switching matrix 200 according to a preferred embodiment of the present invention. The double-sided PCB 60, constituting the second array 20, has Y conductor tracks 21-28 on its upper face 61, and 21'-28' on its lower face 62, with each pair 21,21'-28,28' being interconnected. The PCB 60 constituting the second array 20 is sandwiched between a first single-sided PCB 51 constituting the first array 10 with X conductor tracks 11-14, and a second single-sided PCB 52 constituting the third array 30 with X conductor tracks 15-18.

The Y conductor tracks 21-28 and 21'-28' on the double sided PCB 60 are orientated perpendicularly to the X conductor tracks 11-14 on the first single sided PCB 51 and to the X conductor tracks 15-18 on the second single sided PCB 52. The X tracks 11-18 on the single sided PCBs 51, 52 each face inwards towards the double-sided PCB 60. The first set of contact sleds 41 can thus effect connections between any of X tracks 11-14 on the first single-sided PCB 51 and any of Y tracks 21-28 on the upper face 61 of the double-sided PCB 60; whilst the second set of contact sleds 42 can effect connections between any of X tracks 15-18 on the second single-sided PCB 52 and any of Y tracks 21'-28' on the lower face 62 of the double-sided PCB 60.

The drive spindles 43 passing through the contact sleds 41, 42 run parallel with the X tracks 11-18 on the single sided PCBs 51, 52. The XYX construction enables the lengths of the Y tracks 21-28, 21'-28' on the double sided PCB board 60 to be substantially halved compared to the conventional XY cross-connect matrix 100 described above with reference to FIGS. 1 and 2.

The invention claimed is:

1. A cross-connect switching matrix for use in telecommunications apparatus, comprising:
    a first array of parallel conductor tracks disposed in a first plane;
    a second array of parallel conductor tracks, oriented perpendicular to said first array of conductor tracks, said second array being disposed in a second plane parallel to and spaced from said first plane of said first array;
    a third array of parallel conductor tracks, oriented parallel to said first array of conductor tracks and perpendicular to said second array of conductor tracks, said third array being disposed in a third plane parallel to and spaced from said second plane of said second array;
    a first set of electrical contact sleds arranged be driven between said first and second arrays, thereby to connect any conductor track in said first array with any conductor track in said second array; and
    a second set of electrical contact sleds arranged to be driven between said second and third arrays, thereby to connect any conductor track in said second array with any conductor track in said third array;
    and wherein said second array is located between said first and third arrays.

2. The cross-connect switching matrix of claim 1, for use in a communications distribution frame.

3. The cross-connect switching matrix of claim 1, wherein said parallel conductor tracks in each of said first, second and third arrays are provided as pairs of parallel tracks, and wherein each electrical contact sled in said first and second sets carries a pair of electrical contacts to form metallic pair connections with said pairs of parallel tracks.

4. The cross-connect switching matrix of claim 1, wherein said electrical contact sleds are arranged to be driven in a direction parallel to said conductor tracks in an adjacent array.

5. The cross-connect switching matrix of claim 1, wherein the first set of electrical contact sleds are arranged to be driven in a direction parallel to said conductor tracks in said first array, and the second set of electrical contact sleds are arranged to be driven in a direction parallel to said conductor tracks in said third array.

6. The cross-connect switching matrix of claim 1 wherein said conductor tracks in said second array are simultaneously presented on both upper and lower faces of said array.

7. The cross-connect switching matrix of claim 1, wherein said contact sleds are capable of connecting multiple conductor tracks on said first and/or third arrays with multiple conductor tracks on said second array.

8. The cross-connect switching matrix of claim 1, further comprising drive means arranged to drive said contact sleds.

9. The cross-connect switching matrix of claim 8, wherein the drive means comprises a threaded spindle.

10. The cross-connect switching of claim 1, wherein said first, second and third arrays are printed circuit boards.

* * * * *